United States Patent [19]
Fernandez et al.

[11] Patent Number: 6,141,553
[45] Date of Patent: Oct. 31, 2000

[54] HANDOVER CONTROL METHOD AND APPARATUS USING FUZZY LOGIC

[75] Inventors: Christopher L. Fernandez, Aurora, Ill.; Martine M. Herpers, Erlangen, Germany; James E. Hoch, Warrenville, Ill.; Prashant J. Kurdukar; Masoor Ramesh, both of Naperville, Ill.

[73] Assignee: Lucent Technologies, Inc., Murray Hill, N.J.

[21] Appl. No.: 09/009,147

[22] Filed: Jan. 20, 1998

[51] Int. Cl.⁷ ....................................................... H04Q 7/20
[52] U.S. Cl. ............................................. 455/436; 455/438
[58] Field of Search .................................... 455/436, 437, 455/438, 440, 441, 443, 444, 69, 70, 226.2; 370/331, 332, 333; 706/1, 4, 14

[56] References Cited

U.S. PATENT DOCUMENTS

| | | | |
|---|---|---|---|
| 5,189,734 | 2/1993 | Bailey et al. | 455/436 |
| 5,579,306 | 11/1996 | Dent | 455/68 |
| 5,719,898 | 2/1998 | Davidovici et al. | 455/69 |

FOREIGN PATENT DOCUMENTS

WO 93/26100  12/1993  WIPO .............................. H04B 7/26

*Primary Examiner*—Lee Nguyen

[57] ABSTRACT

A method and an apparatus for using fuzzy logic to determine when handovers are desirable and the extent to which the radio transmission power in a cellular telephone network should be adjusted. The mobile phone and the base transceiver station measure certain system parameters, including rate of handover, quality, distance, level, call duration, and power. These measurements are input to a fuzzifier. The fuzzifier applies standard fuzzy-set-theory membership functions to the measurements, and the fuzzifier outputs a set of fuzzy variables corresponding to the measurements. The fuzzifier outputs are input to an inference engine. The inference engine contains a set of rules that, when applied to the inference engine inputs, indicate: when a handover should be performed; when a handover should not be performed; and the amount by which, if any, the transmission power should be adjusted.

28 Claims, 2 Drawing Sheets

HANDOVER CONTROL METHOD AND APPARATUS USING FUZZY LOGIC

BACKGROUND OF THE INVENTION

1. Field of the Invention

In general, the present invention relates to cellular telephone networks, and more particularly to using fuzzy logic to control handovers in such systems.

2. Statement of Related Art

A cellular telephone network is a system that provides radio communication to and from mobile phones over a large geographical area. Cellular networks generally consist of a plurality of adjoining geographic regions, subdivided into cells. A portion of a prior art cellular telephone network is depicted in FIG. 1.

Each geographic region, commonly referred to as a cell 10, has a base transceiver station 12, which can communicate via radio waves to and from a mobile telephone, which is not shown in FIG. 1. Mobile telephones are often used inside an automobile 22. Each base transceiver station is also connected to a base station controller 16 by a group of land-based telephone lines, commonly referred to as a trunk 14. Each base station controller 16 is typically connected to several base transceiver stations 12, with each base transceiver station 12 serving a different cell 10. Each base station controller 16 is connected by a land-based trunk 18 to a mobile switching center 20. A mobile switching center 20 is typically connected to several base station controllers 16. Finally, a cellular network typically contains several mobile switching centers 20, each mobile switching center 20 is typically connected to several other mobile switching centers 20 and is connected to several base station controllers 16, and each base station controller 16 is typically connected to several base transceiver stations 12.

During a cellular call, a mobile phone communicates with the base transceiver station 12 by using a particular frequency of radio waves. That frequency is pre-determined by the base station controller 16 for the cell 10 in which the mobile phone is located. Often, mobile phones are used in moving automobiles 22 and as the mobile phone moves away from the base transceiver station 12 handling the call, typically the mobile phone gets closer to one or more other base station transceivers 12 and the quality of the transmission between the mobile phone and the base transceiver station 12 handling the call tends to deteriorate. If the quality of transmission decreases significantly, the call must be "handed over" to a different base transceiver station 12 so that the call can continue between the mobile phone and the base transceiver station to which the call is handed over.

Although the mobile phone is initially tuned to a pre-assigned frequency for the call, the mobile phone also monitors other frequencies during a call. The frequencies being monitored may belong to base transceiver stations 12 other than the base transceiver station 12 handling the call. Periodically, the mobile phone transmits, to the base transceiver station 12 handling the call, measurements related to the signal quality for the frequencies that it is monitoring, including the frequency being used for the mobile call in progress.

The two directions in which the mobile phone and a base transceiver station communicate with each other via radio waves are referred to as a down-link and an up-link. The down-link refers to transmissions from the base transceiver station 12 to the mobile, and the up-link refers to transmissions from the mobile phone to the base transceiver station 12.

The mobile phone measures the down-link signal strength, the down-link signal quality, and the battery power being used by the mobile phone to transmit radio waves to the base transceiver station 12. During a mobile call, these measurements are transmitted to the base transceiver station 12, which in turn sends them to the base station controller 16. The base transceiver station 12 measures the up-link signal strength, the up-link signal quality, and the distance between the mobile phone 30 and the base transceiver station 12. The base transceiver station 12 then relays these measurements to the base station controller 16, which determines whether to hand over the call based on the measurements taken by the mobile phone 30, the measurements taken by the base transceiver station 12, the call duration and the rate at which handovers are being performed for a particular call. Call duration and rate of handover are maintained by the base station controller 16.

A base station controller 16 and the base transceiver stations 12 that are connected to the base station controller 16 are referred to as a base station system 24. If a call is handed over from one base transceiver station 12 to another base transceiver station 12 in the same base station system 24, the handover is referred to as an intra-base-station-system handover. If a call is handed over to a base transceiver station 12 in a different base station system 24 that is connected to the same mobile switching center 20 as the first base station controller 12, then the handover is referred to as an intra-mobile-switching-center handover. If a call is handed over to a base transceiver station 12 in a different base station system 24 that is connected to a different mobile switching center 20 than the first base station system's 24 mobile switching center 20, then the handover is referred to as an inter-mobile-switching-center handover.

Excessive handovers are undesirable. When a handover must be performed, the telephone system resources needed for the call must be reserved on another base transceiver station 12, which might be contained within a different base station system 24 and which might be connected to another mobile switching center 20. Inter-mobile-switching-center handovers require setting up voice paths on a trunk between the two mobile switching centers and on a trunk 18 between the new mobile switching center 20 and the new base station controller 16. Setting up these voice paths, requires extensive signaling between the mobile switching centers 20 and between the base station controllers 16 and the mobile switching centers 20.

The boundaries of adjacent cells 10 are usually not well-defined. Therefore, when a mobile phone, for instance, in a moving automobile 22, moves close to the boundaries between geographically adjacent cells, handover control mechanisms using conventional crisp logic often cause unnecessary handovers.

Techniques for determining when to perform handovers are known in the art, and make handover decisions based upon the distance between the mobile phone 30 and the base transceiver station 12 handling the call, the signal quality of the up-link and of the down-link (collectively referred to as "quality"), the up-link and the down-link signal levels (collectively referred to as "level"), in decibels, the power being used to transmit radio waves over the up-link and the down-link (collectively referred to as "power"), and the number of calls being processed by the base transceiver station.

Existing mechanisms for controlling handovers in cellular telephone networks use crisp, as opposed to fuzzy, logic. Using crisp logic in determining whether to perform a handover suffers from the drawback of causing very definite triggers with no way to account for inaccurate data related to the quality of the up-link and down-link radio transmissions. Further, handover is a very complex mechanism. Often, handovers are triggered by little known causes. Handovers can also cause cellular calls to be dropped.

In certain situations, rather than simply deciding whether or not to handover a call, it is desirable to adjust the power being used to transmit over the up-link or the down-link, or both, in order to improve the quality of the received signal.

Crisp logic is based on set theory where a member either belongs to a set or it does not. For example {1,2,3, −1,−2,−3} belong to the set called Integers. {1.2,1.3,1.5} belong to the set of real numbers, but not to the set of integers. For instance, the color of a ball could be in the set {red, blue, green}. However, when the ball is somewhat red, that concept cannot be quantified by discrete mathematical set theory. Fuzzy logic or Fuzzy Set Theory solves this problem by allowing the members of a set to have certain grades of membership that will quantify fuzzy criteria such as not very red, somewhat red, fairly red, very red, etc.

Fuzzy set theory was first proposed by L. A. Zadeh in the 1960s. Since then it has been used in numerous applications such as washing machines, cameras, artificial intelligence, linguistics, economics, filters, databases retrieval systems. Although non-linear systems can be very complicated to model using mathematics base on traditional set theory, fuzzy logic provides a simplified approach to modeling such systems.

It is therefore an object of the present invention to use fuzzy logic to determine whether a handover should be performed and whether the radio transmission power should be increased or decreased in order to more reliably control when handovers are performed, thereby reducing the system resources required to process a particular volume of calls, improving signal quality for calls on the network, and reducing the number of dropped calls.

SUMMARY OF THE INVENTION

The present invention uses fuzzy logic to determine: (1) whether to handover a cellular telephone call from one base transceiver station to another base transceiver station; and (2) whether to increase or decrease the radio transmission power.

Parameters related to the quality of the up-link and down-link radio transmissions, the duration of the call, and the rate at which the call is being handed over are measured. Fuzzy set theory membership functions are applied to these measurements to convert them into fuzz variables based upon certain pre-determined criteria. The fuzzy variables are then input to an inference engine. The inference engine makes handover decisions by applying a pre-determined set of rules to the inference engine inputs. For instance, if the measurements related to the quality of the radio transmissions indicate that a handover should be performed, but, based upon the average call length, the call is almost finished, then a handover is not performed. The subject invention reduces the number of handovers performed when a mobile telephone is straddling the border between adjacent cells by minimizing the number of handovers performed when more handovers are being performed than are warranted based upon the measurements related to the quality of the up-link and down-link radio transmissions. The subject invention also uses fuzzy logic to adjust the amount of power used by the base transceiver station and the mobile phone to transmit radio waves over the down-link and the up-link, respectively, based upon certain pre-determined criteria.

These as well as other novel advantages, details, embodiments, features and objects of the present invention will be apparent to those skilled in the art from the following detailed description of the preferred embodiment of the invention, the attached claims, and the accompanying drawings.

BRIEF DESCRIPTION OF THE DRAWINGS

In the text which follows and in the drawings, wherein similar reference numerals denote similar elements throughout the drawings, the present invention is explained with reference to illustrative embodiments, in which.

DETAILED DESCRIPTION OF THE PREFERRED EMBODIMENT

For a better understanding of the present invention, reference may be had to the following detailed description taken in conjunction with the appended claims and accompanying drawings.

Figure 1:
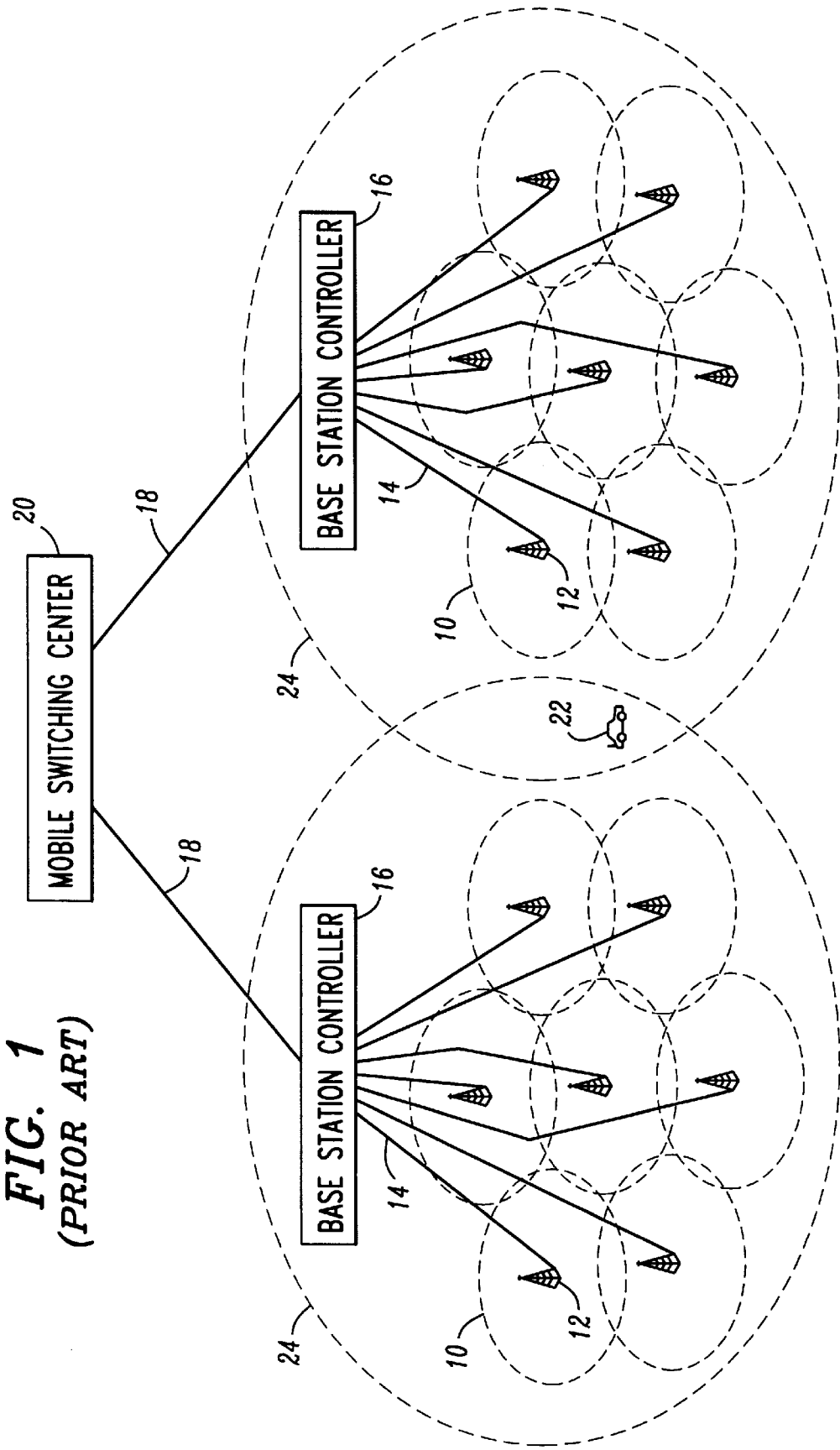
FIG. 1 is a schematic illustration of part of a prior art wireless telephone network.
Figure 2:
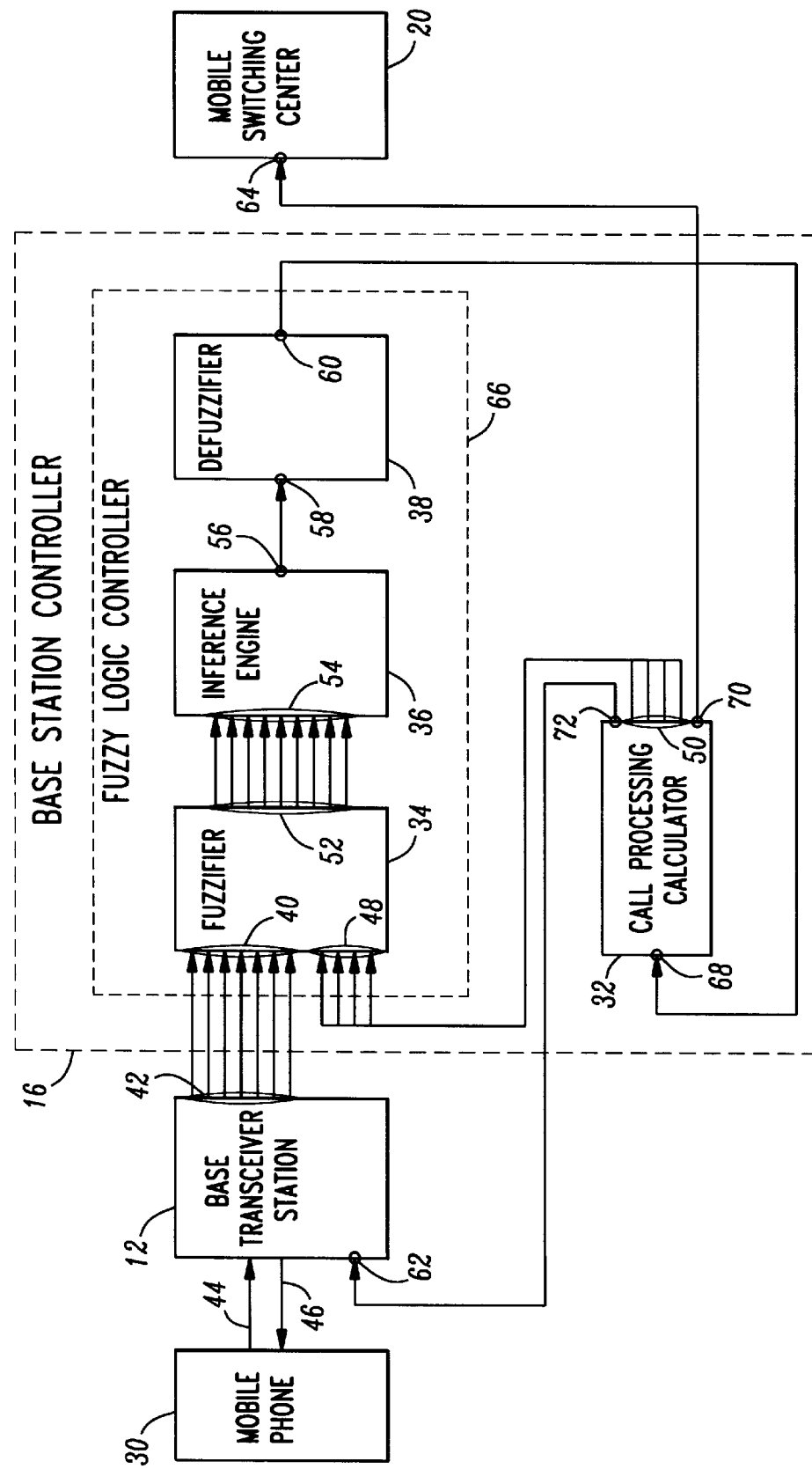
FIG. 2 is a block diagram illustration of a mobile phone, base transceiver station, base station controller, and mobile switching center.

FIG. 2 is a block diagram showing a mobile phone 30; a base transceiver station 12; a base station controller 16, having a call processing calculator 32, and a fuzzy logic controller 66 containing a fuzzifier 34, an inference engine 36, and a defuzzifier 38; and a mobile switching center 20. The base station controller 16 is drawn with a dashed line to indicate that it contains other components that are not shown in FIG. 2.

The previously discussed measurements made by the mobile phone 30 and the base transceiver station 12 are input to the fuzzifier 34, which is part of a fuzzy logic controller 66 and contains one or more standard membership functions, such as triangular, trapezoidal, or square, which are used for fuzzifying the fuzzifier inputs 40 and 48, based upon certain pre-determined criteria. Such membership functions are well known in the art and are explained in *Fuzzy Set Theory Foundations and Applications*, George J. Klir, Ute H. St. Clair, Bo Yuan (Prentice Hall 1997).

A first set of fuzzifier inputs 40 is coupled to outputs 42 of the base transceiver station 12. Each fuzzifier input in the first set 40 typically corresponds to a previously known parameter used in making handover decisions, including, in decreasing order of importance: distance, quality (for both the up-link 44 and the down-link 46), signal level (for both the up-link 44 and the down-link 46), and the power (for both the up-link 44 and the down-link 46). Accordingly, the first set of fuzzifier inputs 40 contains seven inputs, namely, distance, up-link quality, down-link quality, up-link signal level, down-link signal level, up-link signal power, and down-link signal power.

These previously known parameters are collected by the mobile phone 30 and the base transceiver station 12. Although the preferred embodiment uses all of these previously known parameters, it will be obvious to those skilled in the art that any permutation or combination of previously known parameters may be used without departing from the scope of the subject invention.

A second set of fuzzifier inputs 48 is coupled to outputs 50 of the call processing calculator 32. The second set of fuzzifier inputs 48 typically will comprise four inputs, including instantaneous values for rate of handover and call duration, as well as heuristically maintained average values for rate of handover and call duration. Although the preferred embodiment uses all four of these parameters related to rate of handover and call duration, it will be obvious to those skilled in the art that any permutation or combination of these four parameters may be used without departing from the scope of the subject invention.

Each fuzzifier output 52 is a fuzzy variable generated based on one or more of the fuzzifier inputs 40 and 48. Each fuzzifier output 52 is generated by applying a standard membership function to the fuzzifier's corresponding input or inputs 40 and 48. Distance is fuzzified into values of: very close, close, average, far, or very far. Up-link and down-link signal quality are each fuzzified into possible values of: very poor, poor, average, good, and very good. Rate of handover, up-link signal level, down-link signal level, up-link signal power, and down-link signal power are each fuzzified into possible values of: very low, low, average, high, and very high. Call duration is fuzzified into possible values of: very short, short, average, long, and very long. Although each fuzzy variable in the preferred embodiment has five values, it will be obvious to those skilled in the art that fuzzy variables having a number of possible values other than five can also be used without departing from the scope of the subject invention.

In the preferred embodiment, one of the fuzzifier outputs 52 corresponds to rate of handover and one of the fuzzifier outputs 52 corresponds to call duration. These two fuzzifier outputs 52 are generated relative to heuristically calculated averages of rate of handover and call duration. In other words, the call processing calculator 32 maintains a running average value for rate of handover and a running average value for call duration. The instantaneous and average values of rate of handover and call duration are represented in FIG. 2 as outputs 50 from the call processing calculator 32 and as inputs 48 to the fuzzifier 34.

Although the preferred embodiment includes the fuzzifier 34 within the fuzzy logic controller 66 within the base station controller 16, it will be obvious to those having ordinary skill in the art that generating the fuzzy inputs 54 to the inference engine 36 elsewhere and receiving those inputs 54 at the inference engine 36 does not depart from the scope of the subject invention.

The nine fuzzifier outputs 52 represent various system conditions, which have been previously discussed, namely, rate of handover, quality (for both up-link and down-link), distance, level (for both down-link and up-link), call duration, and power (for both up-link and down-link). The fuzzifier outputs 52 are coupled to the inputs 54 of the inference engine 36. The inference engine 36 contains a set of rules that are based upon pre-determined criteria that indicate when handovers are, and are not, desirable as well as when changes in the amount of up-link and down-link transmission power are desirable. The inference engine 36 applies this pre-defined set of rules to the inference engine inputs 54. If the values of the inference engine inputs 54 satisfy any of the rules contained in the inference engine, then the inference engine generates a fuzzy variable at the inference engine output 56. In the preferred embodiment, the fuzzy variable generated by the inference engine, fuzzy handover action, has possible values of: handover desirable, handover undesirable, increase power slightly, increase power moderately, increase to maximum power, decrease power slightly, and decrease power moderately. In the preferred embodiment, the inference engine includes the following rules:

| Rule No. | Rate of Handover | Quality | Distance | Level | Call Duration | Power | INFERENCE ENGINE OUTPUT Fuzzy Handover Action |
|---|---|---|---|---|---|---|---|
| | | FUZZIFIER OUTPUTS/ INFERENCE ENGINE INPUTS | | | | | |
| 1 | average | good | far | | | | handover undesirable |
| 2 | average | poor | far | | | | handover desirable |
| 3 | average | | far | low | | | handover desirable |
| 4 | high | poor | | | average, long, or very long | | handover undesirable |
| 5 | high | poor | | | short | | handover desirable |
| 6 | | very poor | | | | | handover desirable |
| 7 | | | | very low | | | handover desirable |
| 8 | | | very far | | | | handover desirable |
| 9 | | poor | | | long or very long | | handover undesirable |
| 10 | very high | | far | | | | handover undesirable |
| 11 | | poor | | very low | | very low, low, or average | increase power slightly |
| 12 | | very poor | | very low | | very low, low, or | increase power moderately |

-continued

| Rule No. | Rate of Handover | Quality | Distance | Level | Call Duration | Power | INFERENCE ENGINE OUTPUT Fuzzy Handover Action |
|---|---|---|---|---|---|---|---|
| 13 | | poor | | high | | average very high, high, or average | decrease power slightly |
| 14 | | very poor | | very high | | very high, high, or average | decrease power moderately |
| 15 | | low | | low | | | increase to maximum power |

In Table 1, the conditions set forth in the columns containing a condition must all be satisfied in order for a rule's conditions to be satisfied. In other words, for a particular rule, the conditions specified in each column are logically AND'ed, not OR'ed, with the conditions specified in other columns. For instance, rule 1 is satisfied when rate of handover is average, quality is good, and distance is far.

Further, the columns labeled Quality, Level, and Power each represent the quality, level, and power, respectively, for either the up-link 44 or the down-link 46. Rules 1–10, which deal with whether or not a handover is desirable, will be fired if the value specified in any of these three columns is matched for either the up-link 44 or the down-link 46. For example, the requirements of rule 1 will be satisfied if the rate of handover is average, the distance is far, and either: (1) the up-link signal quality is good, or (2) the down-link signal quality is good.

Rules 11–15, which deal with the amount by which the transmission power should be adjusted, are applied separately to the up-link power and the down-link power. Accordingly, the inference engine output 56 could indicate a change for either the up-link transmission power or the down-link transmission power, or both, individually. It will be obvious to those having ordinary skill in the art that any permutation or combination of values could be used to formulate additional rules for determining new up-link and/or down-link transmission power values. It will also be obvious to those having ordinary skill in the art that Table 1 contains a very limited number of rules and that many rules could be added to Table 1 without departing from the scope of the subject invention.

One of the benefits provided by the subject invention is that it may prevent a handover from occurring in a situation where, statistically, the call is almost finished, as is shown in rule number 4 in Table 1. If the duration of a call is, at least, relatively close to the average call duration and the other factors considered in making a handover decision indicate that a handover should be performed, rule 4 in Table 1 is triggered, and a handover is avoided.

Another benefit provided by the subject invention over the prior art is that the subject invention uses the rate at which handovers are occurring in conjunction with other factors to prevent unnecessary, service-interrupting handovers. For instance, the handover rate could be high while the quality, level, and distance parameters are not poor enough to warrant such a high handover rate. Such a situation occurs when the mobile phone 30 is straddling a path where the base transceiver stations 12 are at handover threshold levels, and the thresholds are being tested very frequently. Under these circumstances in prior art systems, handovers can occur at an abnormally high rate, which wastes system resources and could cause dropped calls. Further, the number of handovers performed for a call is provided to the billing software in many cellular telephone networks, and if an excessive number of handovers is occurring, a customer's cellular telephone bill might be increased unnecessarily. Rule 10 in Table 1 minimizes the likelihood of handovers occurring under these conditions, thereby reducing the undesirable effects of an excessive number of handovers occurring.

Although the previously known parameter used for making handover decisions which indicates the number of calls being handled by the base transceiver station 12 was not incorporated into the preferred embodiment, it will be obvious to a person having ordinary skill in the art that rules could be formulated to cause handovers to occur based, at least in part, upon the number of calls being handled by the base transceiver station 12 handling the mobile call without departing from the scope of the subject invention. Such rules could be useful for transferring calls from a base transceiver station 12 handling a relatively high number of calls to a base transceiver station 12 handling fewer calls.

The subject invention also uses fuzzy logic to control the transmission power used by the mobile phone 30 and the base transceiver station 12 in order to reduce the number of handovers required for processing a given volume of calls, as shown in rules 11 through 15. If the inference engine 54 does not output a power-related value, then the amount of transmission power used by mobile phone 30 and the base transceiver station 12 will remain unchanged.

The inference engine output 56 is coupled to the de-fuzzifier input 58. Depending upon the value input to the de-fuzzifier 38, the de-fuzzifier 38 outputs a crisp-logic value indicating either that a handover should or should not be performed, or the de-fuzzifier 38 outputs a new power value, or values, for use by the mobile phone 30 or the base transceiver station 12, or both. As previously mentioned, the change in up-link transmission power and the change in down-link power are controlled independently. For the sake of brevity, the following discussion of how new power values are generated by the de-fuzzifier 38 is limited to modified up-link power values, but applies to down-link power values as well. In the preferred embodiment, the minimum transmission power, $P_{min}$, used by the mobile phone 30 is 20% of the maximum power, $P_{max}$, used by the mobile phone 30. The inference engine output values that indicate power changes, namely, increase power slightly, increase power moderately, decrease power slightly, decrease power moderately, and increase power to the maximum, cause the de-fuzzifier to output a new power value, $P_{new}$, for the mobile phone 30 relative to the mobile phone's current power, P, as follows:

increase power slightly: $P_{new}=P+0.4(P_{max}-P)$;
increase power moderately: $P_{new}=P+0.8(P_{max}-P)$;
decrease power slightly: $P_{new}=P-0.4(P-P_{min})$;
decrease power moderately: $P_{new}=P-0.8(P-P_{min})$ De-fuzzifier output 60 is coupled to call processing calculator input 68. In another embodiment of the subject invention, the inference engine 36 outputs crisp logic values indicating whether a handover should be performed or, if a new power value is desirable, the inference engine 36 outputs the new power value for the mobile phone 30, and there is no de-fuzzifier 38.

If the call processing calculator input 68 indicates that a handover should be performed and the base transceiver station 12 to which the call will be handed over is in a different base station system 24, then the call processing calculator 32 notifies the mobile switching center 20, via call processing calculator output 70, which is coupled to mobile switching center input 64. If the call processing calculator input 68 indicates a new power value for the mobile phone 30 or for the base transceiver station 12, or for both, then the call processing calculator 32 notifies the base transceiver station 12 of the new power value, or values, via call processing calculator output 72, which is coupled to base transceiver input 62. If a new power value is generated for the mobile phone 30, the base transceiver station 12 then transmits that new power value to the mobile phone 30 via the down-link 46.

Although the preferred embodiment is discussed in the context of cellular telephone networks, it will be obvious to those skilled in the art that the subject invention applies to personal communication systems operating in the 900 MHZ range, satellite communication systems, aircraft tracking systems, and any other wireless communication system that performs handovers or message transfers analogous to handovers as they have been described above.

It will also be obvious to those skilled in the art that the subject invention may be implemented: using a programmable fuzzy logic controller; wholly in software; or using microprocessors, micro-controllers, digital signal processors, and the like.

We claim:

1. A method for using fuzzy logic to determine whether to handover a call in a wireless telephone network, said method comprising the steps of:

generating at least one fuzzy inference engine input based on rate or handover and/or call duration, wherein said rate of handover and/or call duration comprises any rate of at least three possible rates of handover and/or any call duration of at least three possible call durations;

receiving fuzzy inference engine inputs comprising said at least one inference engine input; and generating a fuzzy inference engine output indicating whether a handover is desirable by applying said fuzzy inference engine inputs to a pre-defined set of rules contained in an inference engine.

2. The method of claim 1 further comprising, in combination, the step of generating a de-fuzzified inference engine output based upon said fuzzy inference engine output, said de-fuzzified inference engine output indicating whether to perform said handover.

3. The method of claim 1 wherein said fuzzy inference engine output indicates whether a handover is desirable and how much of a change should be made to the transmission power used for transmitting said call.

4. A method for using fuzzy logic to determine whether to handover a call in a wireless telephone network, said method comprising the steps of:

(a) generating fuzzy inference engine inputs based upon pre-determined criteria comprising rate of handover and/or call duration, wherein said rate of handover and/or call duration comprises any rate of at least three possible rates of handover and/or any call duration of at least three possible call durations; and (b) generating a fuzzy inference engine output indicating whether a handover is desirable by applying said fuzzy inference engine inputs to a pre-defined set of rules contained in an inference engine.

5. The method of claim 4 further comprising, in combination, the step of generating a de-fuzzified inference engine output based upon said fuzzy inference engine output, said de-fuzzified inference engine output indicating whether to perform said handover.

6. The method of claim 4 wherein said fuzzy inference engine output indicates whether a handover is desirable and how much of a change should be made to the transmission power used for transmitting said call.

7. The method of claim 4 wherein said generating said fizzy inference engine inputs comprises generating at least one of said fuzzy inference engine inputs based upon rate of handover.

8. The method of claim 4 further comprising, in combination, the step of generating at least one of said fuzzy inference engine inputs based upon quality.

9. The method of claim 4 further comprising, in combination, the step of generating at least one of said fuzzy inference engine inputs based upon distance.

10. The method of claim 4 further comprising, in combination, the step of generating at least one of said fuzzy inference engine inputs based upon level.

11. The method of claim 4 wherein said generating fuzzy inference engine inputs comprises generating at least one of said fuzzy inference engine inputs based upon call duration.

12. A computer controlled telecommunications system, at least partly controlled by using fuzzy logic, said system comprising:

(a) means for generating fuzzy inference engine inputs based upon information, obtained from said telecommunications system, comprising rate of handover and/or call duration, wherein said rate of handover and/or call duration comprises any rate of at least three possible rates of handover and/or any call duration of at least three possible call durations; and (b) means for generating a fuzzy inference engine output indicating whether a handover is desirable by applying said fuzzy inference engine inputs to a pre-defined set of rules contained in an inference engine.

13. An apparatus for using fuzzy logic to determine whether to handover a call in a wireless telephone network, said apparatus comprising:

(a) means for generating fuzzy inference engine inputs based upon pre-determined criteria comprising rate of handover and/or call duration, wherein said rate of handover and/or call duration comprises any rate of at least three possible rates of handover and/or any call duration of at least three possible call durations; and (b) means for generating a fuzzy inference engine output indicating whether a handover is desirable by applying said fuzzy inference engine inputs to a pre-defined set of rules contained in an inference engine.

14. The apparatus of claim 13 further comprising, in combination, means for generating a de-fuzzified inference engine output based upon said fuzzy inference engine output, said de-fuzzified inference engine output indicating whether to perform said handover.

15. The apparatus of claim 13 wherein said fuzzy inference engine output indicates whether a handover is desirable and the amount by which the transmission power for said call should be changed.

16. The apparatus of claim 13 wherein said means for generating fuzzy inference engine inputs comprises means for generating at least one of said fuzzy inference engine inputs based upon rate of handover.

17. The apparatus of claim 13 further comprising, in combination, means for generating at least one of said fuzzy inference engine inputs based upon quality.

18. The apparatus of claim 13 further comprising, in combination, means for generating at least one of said fuzzy inference engine inputs based upon distance.

19. The apparatus of claim 13 further comprising, in combination, means for generating at least one of said fuzzy inference engine inputs based upon level.

20. The apparatus of claim 13 wherein said means for generating fizzy inference engine inputs comprises means for generating at least one of said fuzzy inference engine inputs based upon call duration.

21. An apparatus for using fuzzy logic to determine whether to handover a call in a wireless telephone network, said apparatus comprising:

(a) a base transceiver station having one or more outputs;

(b) a call processing calculator having one or more outputs;

(c) a fuzzifier having two sets of inputs and a set of outputs, said first set of fuzzifier inputs being coupled to said base transceiver station outputs and said second set of fuzzifier inputs being coupled to said call processing calculator outputs, at least one of said fuzzy inference engine inputs being based on rate of handover and/or call duration, wherein said rate of handover and/or call duration comprises any rate of at least three possible rates of handover and/or any call duration of at least three possible call durations; and (d) an inference engine having:
  (1) inputs that are coupled to said fuzzifier outputs,
  (2) an output, and
  (3) a pre-determined set of rules to be applied to said inference engine inputs.

22. The apparatus of claim 21 further comprising a defuzzifier having an output and an input, said defuzzifier input being coupled to said inference engine output.

23. The apparatus of claim 21 wherein at least one of said fuzzy inference engine inputs is based upon rate of handover.

24. The apparatus of claim 21 further comprising at least one of said fuzzy inference engine inputs being based upon quality.

25. The apparatus of claim 21 further comprising at least one of said fuzzy inference engine inputs being based upon distance.

26. The apparatus of claim 21 further comprising at least one of said fuzzy inference engine inputs being based upon level.

27. The apparatus of claim 21 wherein at least one of said fuzzy inference engine inputs is based upon call duration.

28. A method for using fuzzy logic to determine whether to handover a call in a wireless telephone network, said method comprising the steps of:

(a) generating fuzzy inference engine inputs based upon pre-determined criteria wherein at least one of said fuzzy inference engine inputs is based upon any rate of handover of at least three possible rates of handover, at least one of said fuzzy inference engine inputs is based upon quality, at least one of said fuzzy inference engine inputs is based upon distance, at least one of said fuzzy inference engine inputs is based upon level, at least one of said fuzzy inference engine inputs is based upon any call duration of at least three possible call durations, and at least one of said fuzzy inference engine inputs is based upon power;

(b) generating a fuzzy inference engine output indicating whether a handover is desirable by applying said fuzzy inference engine inputs to a pre-defined set of rules contained in an inference engine; and (c) generating a de-fuzzified inference engine output based upon said fuzzy inference engine output, said de-fuzzified inference engine output indicating whether to perform said handover and how much of a change should be made to the transmission power used for transmitting said call.

* * * * *